United States Patent
Riccardo et al.

(10) Patent No.: US 6,549,280 B2
(45) Date of Patent: Apr. 15, 2003

(54) SPECTROMETER WITH DOUBLE OFF-AXIS SCHMIDT TELESCOPE

(75) Inventors: Paolinetti Riccardo, Florence (IT); Pieri Silvano, Florence (IT); Romoli Andrea, Florence (IT)

(73) Assignee: Galileo Avionica S.p.A. (IT)

( * ) Notice: Subject to any disclaimer, the term of this patent is extended or adjusted under 35 U.S.C. 154(b) by 13 days.

(21) Appl. No.: 09/871,538

(22) Filed: May 31, 2001

(65) Prior Publication Data
US 2002/0001079 A1 Jan. 3, 2002

(30) Foreign Application Priority Data
Jun. 5, 2000 (EP) .............................. 00830399

(51) Int. Cl.⁷ .................................. G01J 3/28
(52) U.S. Cl. ................ 356/326; 356/305; 356/323; 356/334
(58) Field of Search ................. 356/305, 323, 356/326, 328, 334

(56) References Cited

U.S. PATENT DOCUMENTS

| | | | |
|---|---|---|---|
| 4,984,888 A | | 1/1991 | Tobias ........................ 356/328 |
| 5,285,255 A | * | 2/1994 | Baranne et al. .............. 356/302 |
| 5,565,983 A | * | 10/1996 | Barnard ...................... 356/328 |
| 5,917,594 A | * | 6/1999 | Norton ........................ 250/372 |

FOREIGN PATENT DOCUMENTS

| | | |
|---|---|---|
| EP | 0 316 802 | 5/1989 |
| JP | 11264762 | 9/1999 |

* cited by examiner

Primary Examiner—Mark A. Robinson
(74) Attorney, Agent, or Firm—McGlew and Tuttle, P.C.

(57) ABSTRACT

The spectrometer comprises, in combination: a slit (1) for the entry of a light beam; a collimator; a dispersion system (9); focusing means and a detector (13). The collimator comprises at least a first concave spherical mirror (3) and at least a first Schmidt plate (5) in an off-axis arrangement.

22 Claims, 3 Drawing Sheets

(A)  (B)

SPECTROMETER WITH DOUBLE OFF-AXIS SCHMIDT TELESCOPE

DESCRIPTION

The present invention relates to a spectrometer for the spectral analysis of a beam of light radiation, which can be used, for example, on orbiting satellites, on aircrafts, or for other applications.

More particularly, the present invention relates to a spectrometer of the catadioptric type, in other words one based on the use of reflecting and refracting elements.

Catadioptric spectrometers having a variety of configurations and characterized by the use of mirrors and lenses in various configurations are currently in existence. A spectrometer generally has a slit through which an incoming light beam enters, a collimator, a dispersion system and a detector.

The object of the present invention is to provide a spectrometer of the aforesaid type which has a particularly simple structure.

Within the ambit of this general object, the object of a particular embodiment of the invention is to provide a spectrometer in which the glass elements can be reduced toga minimum. A further object of the present invention is to provide a wide-aperture spectrometer.

The reduction of the glass elements is particularly important in spectrometers for space applications, since glass does not withstand cosmic radiation (gamma rays, protons, neutrons). This radiation causes a gradual loss of transparency of up to 70% for virtually all glass, with consequent loss of efficiency of the spectrometer. Furthermore, the "radiation hardened" glass available on the market has low transparency at the short wavelengths (below 500 nm), with the exception of quartz and crown glass.

According to the invention, the collimator of the spectrometer is made with the use of at least one first concave spherical mirror and at least one Schmidt plate. Schmidt plates, in combination with spherical mirrors, are known elements in the construction of what are called Schmidt telescopes. There are at present no known applications of this optical component as a spectrometer.

In one practical embodiment, the plate is positioned between the spherical mirror and the dispersion system. However, the positioning of the Schmidt plate between the two elements forming the dispersion system is not excluded, particularly when the dispersion system comprises, for examples two prisms.

Theoretically, it is possible to construct a spectrometer according to the invention with one spherical mirror and a single Schmidt plate, using a configuration known as "Littrow configuration" in the literature. The beam entering through the slit follows an optical path along which it encounters a first portion of spherical mirror from which it is reflected toward the Schmidt plate and passes through this to reach the dispersion system. The dispersed beam emerging from the dispersion system is reflected by a flat mirror and again passes through the dispersion system and then passes a second time through the Schmidt plate, in a portion slightly different from the one passed through initially, and is finally reflected, by a portion of the spherical mirror slightly different from the incoming portion, toward the detector.

A configuration of this type is particularly compact but gives rise to certain problems of mechanical interference, since the slit and the detector have to be positioned on the optical axis of the spherical mirror, between this mirror and the flat surface of the Schmidt plate.

In the most suitable and convenient embodiment of the spectrometer according to the invention, at least the following elements are positioned in succession along the path of the beam from the entry point represented by the slit made in one mirror:

the first spherical mirror,
the first Schmidt plate,
the dispersion system,
a second Schmidt plate,
a second spherical mirror,
the detector.

Optical components can also be placed in suitable positions to eliminate the field curvature and/or the image curvature of the slit (called the slit curvature) as illustrated in greater detail below.

In the absence of correctors of the curvature, the beam entering the device through the slit is reflected by the first spherical mirror toward the first Schmidt plate and emerges from this to pass through the dispersion system. The dispersed beam, emerging from the dispersion system through a second Schmidt plate, is reflected by the second spherical mirror and finally reaches the detector.

Characteristically, and in a different way from what is found in conventional applications, the Schmidt plate, although its axis of revolution passes through the center of the spherical mirror, is struck by the beam off axis.

The dispersion system which is used can be any system suitable for this purpose, for example a system formed by one or more dispersion prisms, one or more dispersion gratings, devices known as "grisms", or combinations of these elements.

The Schmidt plate can advantageously be made from quartz or radiation-resistant glass of the crown type, as can the dispersion system. Thus all components made from flint glass are eliminated from the spectrometer, providing the advantage of eliminating components subject to loss of transparency as a result of cosmic radiation.

The incoming beam which passes through the slit usually originates from a telescope which typically generates a curved image (field curvature), in other words one not lying on a flat surface. This curvature can be of opposite sign to that introduced by the optical components of the spectrometer. If the two curvatures are identical and of opposite sign, they compensate each other and no further corrective arrangements need to be provided.

Conversely, it is possible that the two field curvatures (that introduced by the spectrometer and that introduced by the telescope which supplies the beam entering the spectrometer) will be of different sizes and will not compensate each other. In some cases, the telescope may supply, a flat image. Depending on the circumstances. It is necessary to provide corrective optical components at suitable positions along the optical path of the spectrometer. These can comprise a curve slit, optical fiber corrective components, corrective elements of the dioptric (lens), catoptric (mirror) or catadioptric (combined) types. These field curvature compensation systems can be associated with the beam entry slit, with the detector, or with both.

Systems for correcting what is called the slit curvature can also be provided.

Further advantageous characteristics of the spectrometer according to the invention are indicated in the attached claims.

The invention will be more clearly understood from the description and the attached drawing, which shows a practical and non-restrictive embodiment of the invention. In the drawing, FIG. 1 shows a schematic view from above of the spectrometer according to the invention, limited to its fundamental components;

Figure 1:
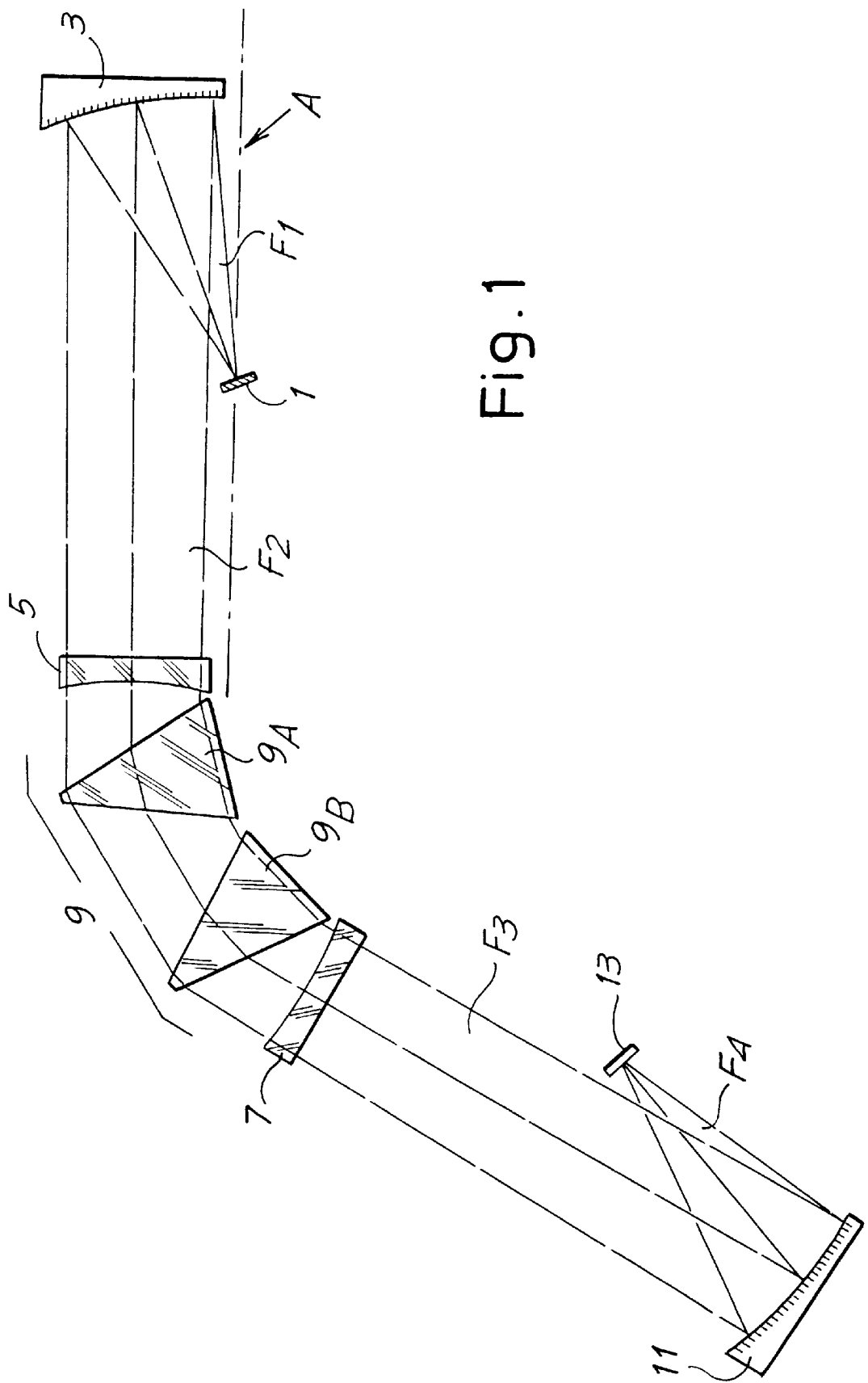

With reference initially to FIG. 1, the spectrometer comprises an entry slit 1, whose dimensions are determined according to the optical system which generates the incoming image. In particular, and by way of example, the slit 1 can have dimensions of 12×0.040 mm. The slit 1 is associated with a concave spherical mirror 3, whose optical axis is indicated by A.

The device also comprises a first Schmidt plate 5, a second Schmidt plate 7 and a dispersion system 9 positioned between the two Schmidt plates 5 and 7. In this example of embodiment, the dispersion system 9 comprises two prisms 9A and 9B.

A second concave spherical mirror 11 is placed on the side of the dispersion system 9 opposite the mirror 3, and is associated with a detector 13.

As shown schematically in FIG. 1, the beam entering from the slit 1, and represented by the lines F1, strikes the mirror 3 and is reflected (beam F2) toward the Schmidt plate 5. The beam F2 is a collimated beam, while the Schmidt plate 5 corrects the spherical aberration. The collimated beam emerging from the Schmidt plate 5 enters the dispersion system 9 and emerges in the form of its chromatic components, suitably dispersed by the output face of the prism 9B (beam F3), to pass through the plate 7 and reach the reflecting surface of the second spherical mirror 11. From here, the beam is reflected and focused (beam F4) on the detector 13.

In the diagram in FIG. 1, the components for the correction of the field and slit curvature have been omitted.

The system described in FIGS. 1–4 is symmetrical, in the sense that it comprises two spherical mirrors 3 and 11, two Schmidt plates 5 and 7 and the dispersion system 9 in an intermediate position between the two plates. The Schmidt plates 5 and 7 are positioned outside the optical axis A common to the two spherical mirrors 3 and 11. However, this is not the only possible configuration of the spectrometer according to the invention. This is because, in the case described, the field of vision (in other words the long part of the slit 1) is in the orthogonal direction with respect to FIG. 1, but the instrument can also operate with the field of vision lying in the plane of FIG. 1.

In the diagram in FIG. 1, the components for correcting or compensating the field curvature, introduced by the telescope and by the components of the spectrometer, and the slit curvature have been omitted.

These curvatures can be corrected in various ways. Where the correction of the field curvature is concerned, a first possibility consists, as mentioned previously, in using a telescope which supplies a curved image with a field curvature equal and of opposite sign to that introduced by the spectrometer. In this case, the two curvatures compensate each other and the slit 1 is curved with the same radius of curvature as the image produced by the telescope.

Figure 2:
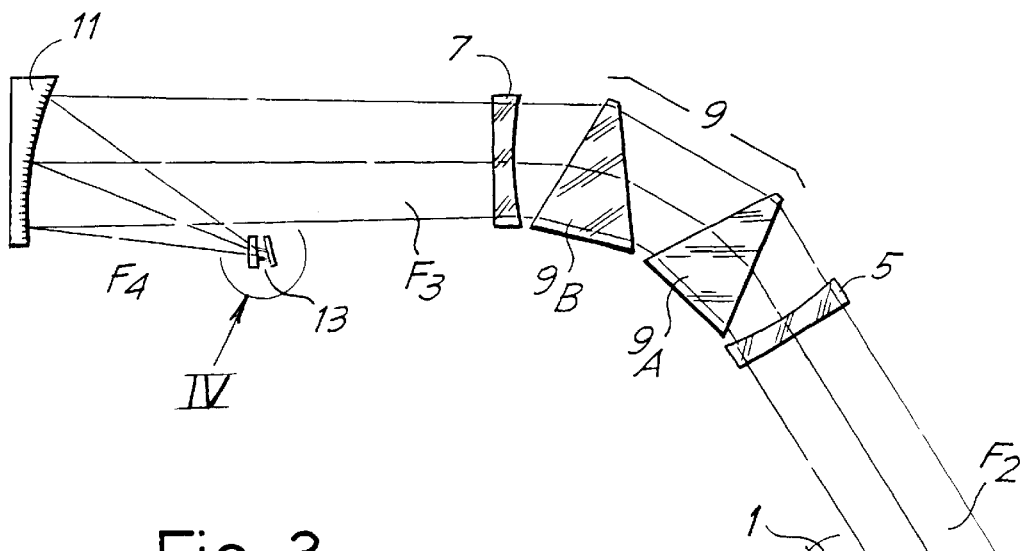
FIG. 2 shows a view similar to the view of FIG. 1, with the indication of possible elements for compensating the field and slit curvature.
Figure 3:
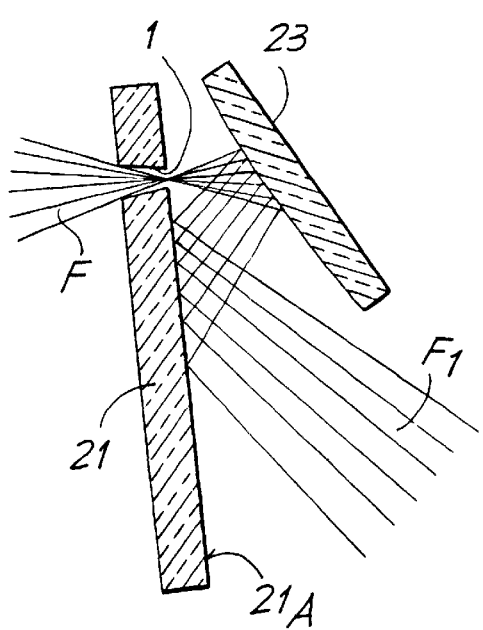
FIGS. 3 and 4 show a device for correcting the slit curvature and for correcting the field curvature.
Figure 4:
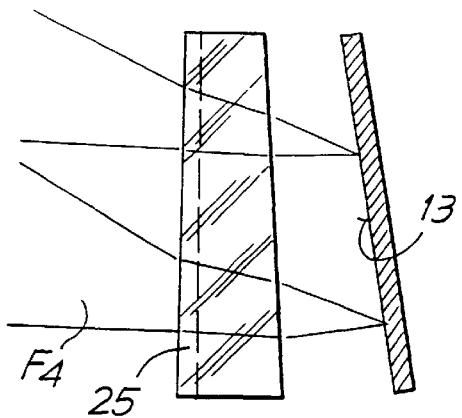

FIGS. 2, 3 and 4 show a different solution for the compensation of the field curvature and the slit curvature. FIG. 2 shows a diagram similar to that of FIG. 1, with the indication of the positions (arrows III and IV) of the field and slit curvature compensation elements, shown on a larger scale in FIGS. 3 and 4.

More particularly, FIG. 3 shows a system for correcting the slit curvature, comprising a flat mirror 21 in which is made the slit 1 through which the beam F from the telescope passes. The slit 1 extends orthogonally to the plane of the figure. The beam F is reflected by a curved mirror 23 with its convex side facing the slit 1. The radius of curvature of the mirror 23 is very large and in the diagram in FIG. 3 it has been deliberately reduced from the real size to make the curvature of the mirror visible. The beam reflected by the mirror 23 is directed toward the internal reflecting surface 21A of the flat mirror 21 and from here (beam. F1) toward the spherical mirror 3.

FIG. 4 shows an enlargement of a component for correcting the field curvature, associated with the detector 13. It comprises a wedge-shaped cylindrical lens (optical wedge) 25, shown very schematically and with the wedge angle exaggerated with respect to the real angle, to facilitate graphic representation. The detector 13 is positioned on an inclined plane behind the optical wedge 25.

Figure 5:
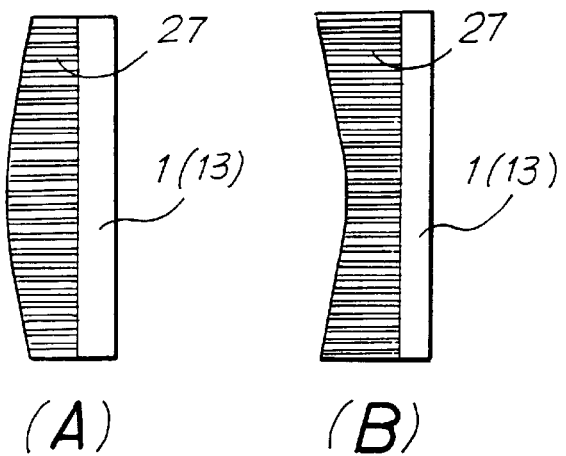
FIGS. 5A and 5B show schematically two configurations of a system for correcting the field curvature of the image originating from the telescope associated with the spectrometer, using optical fibers.

Conversely, it is possible to associate the slit 1 and/or the detector 13 with a system of optical fibers which adapt the slit to the curvature of the spectrometer. This solution is shown schematically in FIGS. 5A and 5B, where the optical fibers are indicated by 27. They are interfaced with the slit 1 or with the detector 13, depending on where the corrector device is positioned. This is indicated schematically in FIGS. 5A and 5B by the double numbering 1; 13 associated with the component interfaced with the optical fibers 27. The two solutions in FIGS. 5A and 5B correspond to situations with field curvatures of opposite sign.

Figure 6:
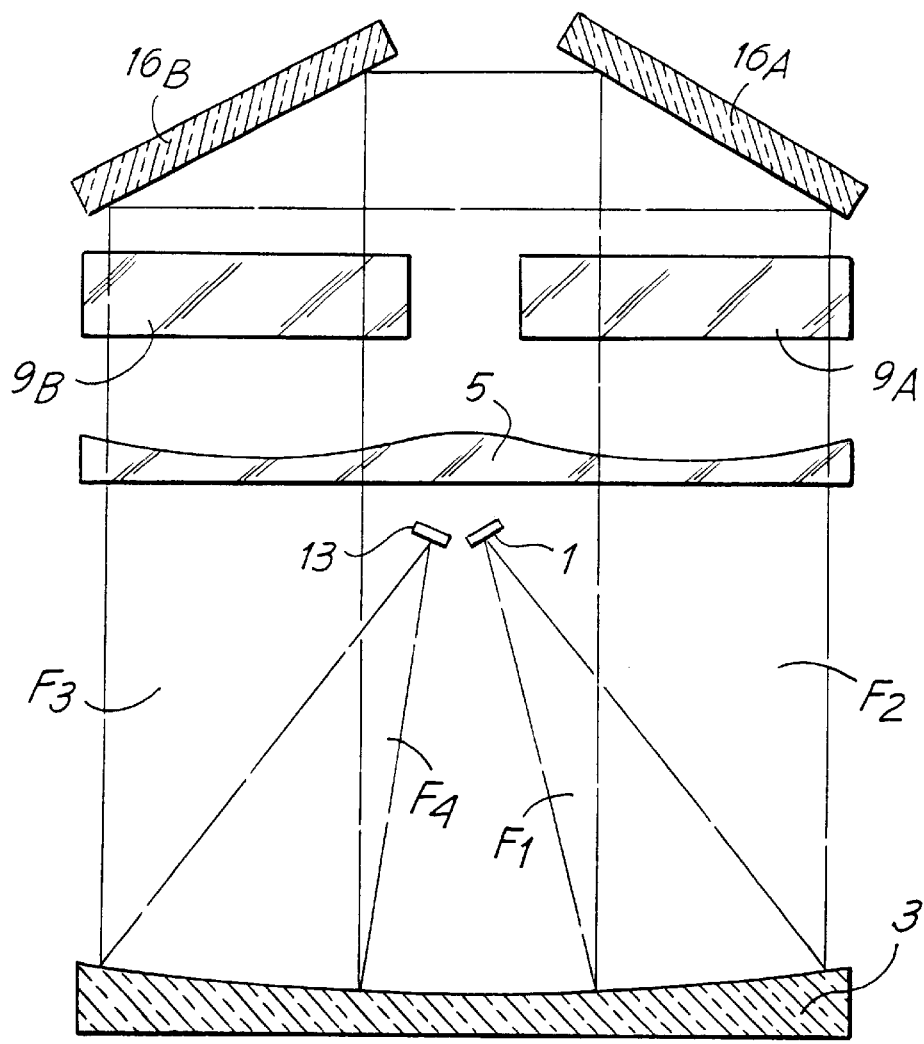
FIG. 6 shows an embodiment with a single mirror and a single Schmidt plate.

FIG. 6 shows in a highly schematic way a different embodiment of the spectrometer, which can presumably operate with a lower aperture rating. In this case, a single spherical mirror 3 and a single Schmidt plate 5 are provided. Both the slit 1 and the detector 13 are placed between the flat surface of the Schmidt plate 5 facing the concave reflecting surface of the spherical mirror 3 and the concave surface itself. On the opposite side of the Schmidt plate 5, two dispersion prisms 9A and 9B are placed, facing two separate portions of the Schmidt plate 5. Two reflecting elements (for example mirrors or prisms) 16A and 16B bend the beam so that, having arrived from the spherical mirror 3, it returns toward the same mirror.

In this case, the path of the beam entering from the slit 1 is as follows: the beam F1 striking the concave surface of the spherical mirror 3 is reflected (beam F2) toward a first portion of the Schmidt plate 5. The beam emerging from the Schmidt plate 5 enters the dispersion prism 9A and is bent by the reflecting system 16A, 16B toward the second dispersion prism 9B. The dispersed beam emerging from the prism 9B passes through the Schmidt plate 5 enters a point different from that which was passed through initially (beam F2) and the beam emerging from the flat surface of the Schmidt plate 5 (beam F3) strikes the reflecting surface of the spherical mirror 3 in an area which is offset from the axis and different from the portion from which the beam entering from the slit 1 was reflected. The beam (F4) is reflected by the surface of the mirror 3 and finally reaches the detectors 13.

FIG. 6 shows clearly that the portions of the Schmidt plate through which the beams F2 and F3 pass are offset from the axis. In other words, the area around the optical axis (axis of symmetry) of this optical component is not used. This is also true of the spherical mirror 3 which is axially aligned with the Schmidt plate 5, and of which two portions to the side of the optical axis are used. The same is true of the configuration shown in the preceding FIGS. 1 and 2. In other words, the arrangement is an "off-axis" one.

It is to be understood that the drawing shows only a simplified version provided solely as a practical demonstration of the invention, which can be varied in its forms and arrangements without thereby departing from the scope of the guiding principle of the invention. The presence of any reference numbers in the attached claims has the purpose of facilitating the reading of the claims with reference to the description and to the drawing, and does not restrict the scope of protection represented by the claims.

What is claimed is:

1. A spectrometer comprising, in combination:
   a slit for the entry of a light beam;
   a collimator including at least a first concave spherical mirror and at least a first Schmidt plate;
   a dispersion system;
   focusing means including a second concave spherical mirror and at least a second Schmidt plate for focusing a dispersed beam;
   a detector receiving a beam from said focusing means.

2. The spectrometer as claimed in claim 1, characterized in that one of said Schmidt plates and said spherical mirrors are positioned in an off-axis configuration.

3. The spectrometer as claimed in claim 1, characterized in that it comprises means for correcting the field curvature.

4. The spectrometer as claimed in claim 1, characterized in that it comprises means for correcting the slit curvature.

5. The spectrometer as claimed in claim 1, characterized in that one of said Schmidt plates is positioned between one of the spherical mirrors and said dispersion system.

6. The spectrometer as claimed in claim 1, characterized in that at least the following elements are arranged in succession along the path of the beam entering from said slit:
   the first spherical mirror;
   the first Schmidt plate;
   the dispersion system;
   the second Schmidt plate;
   the second spherical mirror;
   the detector.

7. The spectrometer as claimed in claim 1, characterized in that said dispersion system comprises at least one or more dispersion prisms.

8. The spectrometer as claimed in claim 1, characterized in that said dispersion system comprises at least one dispersion grating.

9. The spectrometer as claimed in claim 1, characterized in that said dispersion system comprises at least one prism.

10. A spectrometer comprising, in combination:
    a slit for entry of a light beam, said silt being formed in a flat mirror;
    a curved mirror which reflects the beam entering from said silt toward said flat mirror, said curved mirror correcting silt curvature;
    a collimator including at least a first concave spherical mirror receiving the beam from said flat mirror and at least a first Schmidt plate;
    a dispersion system;
    focusing means; and
    a detector.

11. The spectrometer as claimed in claim 10, further comprising: a wedge-shaped cylindrical lens associated with the detector for correcting field curvature.

12. The spectrometer as claimed in claim 10, wherein said focusing means includes the first spherical mirror, and the first Schmidt plate, which are struck in different portions by the beam arriving from the silt and by the beam focused on the detector.

13. The spectrometer as claimed in claim 12, characterized in that said slit, said first spherical mirror, said Schmidt plate and said dispersion system are arranged in such a way as to form an optical path for the beam entering from said slit, along which the beam entering from said slit is reflected by said first spherical mirror toward said Schmidt plate and, on emerging from said Schmidt plate, passes through the dispersion system, the dispersed beam being reflected and passing again through the dispersion system and the Schmidt plate, to be focused by the first spherical mirror on said detector.

14. A spectrometer comprising, in combination:
    a slit for the entry of a light beam, said silt being curved with a radius of curvature equal to a radius of curvature of an image originating from an observation telescope, which compensates curvature of the spectrometer,
    a collimator;
    a dispersion system;
    focusing means;
    a detector;
    characterized in that said collimator comprises at least a first concave spherical mirror and at least a first Schmidt plate.

15. A spectrometer comprising:
    a slit for passing a light beam;
    a collimator receiving the light beam from said slit, said collimator including a first concave spherical mirror and a first Schmidt plate;
    a dispersion system receiving the light beam from the collimator;
    focusing means receiving the light beam from the dispersion system, said focusing means including a second concave spherical mirror and a second Schmidt plate for focusing the light beam;
    a detector receiving the light beam from said focusing means.

16. A spectrometer in accordance with claim 15, wherein:
    said first and second concave spherical mirrors are on two separate portions of a single larger concave spherical mirror.

17. A spectrometer in accordance with claim 16, wherein:
    said first and second Schmidt plates are on two separate portions of a single, larger Schmidt plate.

18. A spectrometer in accordance with claim 17, wherein:
    said two separate portions of said single larger concave spherical mirror are spaced from each other,
    said two separate portions of said single larger Schmidt plate are spaced from each other.

19. A spectrometer as claimed in claim 17, wherein: said slit, said single larger concave spherical mirror, said single larger Schmidt plate and said dispersion system are arranged in such a way as to form an optical path for the beam entering from said slit, along which the beam entering from said slit is reflected by said single larger concave spherical mirror toward said single larger Schmidt plate and, on emerging from said single larger Schmidt plate, passes through the dispersion system, the dispersed beam being reflected and passing again through the dispersion system and the single larger Schmidt plate to be focused by the single larger concave spherical mirror on said detector.

20. A spectrometer comprising:

a slit for passing a light beam;

a collimator receiving the light beam from said slit, said collimator including a concave spherical mirror and a Schmidt plate;

a dispersion system receiving the light beam from said collimator;

focusing means receiving the light beam from said dispersion system;

a detector receiving the light beam from said focusing means;

a plurality of optical fibers arranged in a system to adapt a curvature of an image entering from said silt and originating from an observation telescope.

21. The spectrometer as claimed in claim 20, wherein:

said system of optical fibers is associated with said slit.

22. The spectrometer as claimed in claim 20, wherein:

said system of optical fibers ii associated with said detector.

* * * * *